United States Patent [19]

Enami et al.

[11] Patent Number: 4,709,285
[45] Date of Patent: Nov. 24, 1987

[54] HEAD ASSEMBLIES MOUNTED FOR OPTIMUM CONTACT WITH A FLEXIBLE MAGNETIC DISK

[75] Inventors: Katsuya Enami, Tachikawa; Sinobu Kawamura, Tokyo; Fumio Nagase, Tama; Shinichi Aikawa, Mitaka, all of Japan

[73] Assignee: Teac Corporation, Tokyo, Japan

[21] Appl. No.: 774,337

[22] Filed: Sep. 10, 1985

[30] Foreign Application Priority Data

Sep. 17, 1984 [JP] Japan .................. 59-194455

[51] Int. Cl.$^4$ ...................... G11B 5/016; G11B 5/596; G11B 21/20
[52] U.S. Cl. .................................. 360/104; 360/105; 360/99
[58] Field of Search .......................... 360/99, 104, 105

[56] References Cited

U.S. PATENT DOCUMENTS 4,320,426  3/1982  Thompson .......................... 360/105
4,379,316  4/1983  Krane .................................. 360/105

FOREIGN PATENT DOCUMENTS 58-77080  5/1983  Japan .
59-90259  5/1984  Japan .................................. 360/104

Primary Examiner—Robert S. Tupper
Attorney, Agent, or Firm—Woodcock Washburn Kurtz Mackiewicz & Norris

[57] ABSTRACT

An apparatus having a pair of magnetic transducer head assemblies for data transfer contact with the opposite faces of a flexible magnetic disk. One of the head assemblies has its disk engaging surface disposed at an angle to the normal plane of the magnetic disk in order to hold the disk engaging surfaces of both head assemblies in proper data transfer contact with the magnetic disk in spite of its wobbling movements during rotation. The disk engaging surface of that one head assembly slants away from the normal disk plane in a direction that can be anywhere between a radially inward direction of the magnetic disk and a tangential direction of a notional circle drawn concentrically on the magnetic disk, the tangential direction being upstream of the magnetic disk with respect to its predetermined direction of rotation. As the other head assembly is gimbaled and sprung against the slanting head assembly via the intervening magnetic disk, both head assemblies can be held in proper data transfer engagement with the disk despite its undulations in both radial and tangential directions.

3 Claims, 10 Drawing Figures

HEAD ASSEMBLIES MOUNTED FOR OPTIMUM CONTACT WITH A FLEXIBLE MAGNETIC DISK

BACKGROUND OF THE INVENTION

Our invention relates to an apparatus having a pair of magnetic transducer head assemblies for data transfer with a double sided flexible magnetic disk. More particularly, our invention pertains to such a data transfer apparatus wherein the pair of head assemblies are arranged for optimum data transfer contact with the flexible magnetic disk.

Japanese Laid Open Patent Application No. 58-77080 filed by the assignee of our instant application (corresponding U.S. patent application Ser. No. 434,400 now U.S. Pat. No. 4,602,306, in the name of Noda) represents a typical conventional data transfer apparatus for use with a double sided flexible magnetic disk. The pair of transducer head assemblies of this known apparatus are both gimbal supported, with their gapped disk engaging surfaces disposed parallel to the normal plane of the magnetic disk. We object to this arrangement of the head assemblies for the following reasons.

The disk engaging surfaces of the head assemblies will stay parallel to the normal plane of the intervening magnetic disk as long as the disk remains absolutely flat, with no force exerted on the gimbal supports via the head assemblies. Being very limply flexible, however, the magnetic disk cannot possibly remain exactly planar during rotation. The unavoidable wobbling movements of the magnetic disk result in the application of higher frictional forces thereon by the disk engaging surfaces, and particularly by their leading end portions, of the head assemblies as the disk slides therebetween. The exertion of the frictional forces is of course undesirable as such forces accelerate the wear and abrasion of the disk.

The gimbaling of both head assemblies, as has been suggested by the noted prior application, gives rise to the additional problem that, upon tilting of both head assemblies during the rotation of the magnetic disk, the leading end portions of their disk engaging surfaces exert still greater frictional forces on the disk.

The wobbling of the magnetic disk also takes place in its radial direction, the disk being clamped only at its central portion and being slidably engaged between the pair of head assemblies at a point spaced radially outwardly therefrom. The undulations of the magnetic disk take place between these points, impairing the proper data transfer contact of the head assemblies with the disk.

SUMMARY OF THE INVENTION

We have hereby found out, in a data transfer apparatus for use with a double sided flexible magnetic disk, how to maintain the pair of magnetic transducer head assemblies in proper data transfer engagement with the disk in the face of its undulations in both tangential and radial directions.

Our invention may be summarized as an apparatus for data transfer with a double sided flexible magnetic disk, comprising disk drive means for imparting a predetermined direction of rotation to the magnetic disk in a preassigned data transfer position, with the disk drive means including a disk bearing surface for holding the magnetic disk thereon during its rotation, and carriage means controllably movable radially of the magnetic disk being held in the data transfer position. Mounted to the carriage means, a first magnetic transducer head assembly has a gapped disk engaging surface, for contact with one of the opposite faces of the magnetic disk, disposed at an angle to a reference plane containing the disk bearing surface of the disk drive mechanism. The disk engaging surface of the first transducer head assembly slants away from the reference plane in a direction anywhere between a first extreme direction oriented radially inwardly of the magnetic disk from the first transducer head assembly and a second extreme direction extending from the first transducer head assembly tangentially of a notional circle drawn concentrically on the magnetic disk, the second extreme direction being oriented upstream of the magnetic disk with respect to the predetermined direction of rotation thereof. A second magnetic transducer head assembly is pivotally mounted to the carriage means and has a gapped disk engaging surface for contact with the other of the opposite faces of the magnetic disk. The disk engaging surfaces of the two transducer head assemblies are substantially in register with each other when in contact with the magnetic disk.

Preferably, the first head assembly is mounted to the carriage means via a flexure seat which deflects substantially only in a direction perpendicular to the magnetic disk. The second head assembly, on the other hand, is gimbaled on the carriage means. Since the disk engaging surfaces of the first and second head assemblies are sprung against each other via the intervening magnetic disk, both head assemblies can conform to the unavoidable undulations of the disk in both tangential and radial directions and so remain in good data transfer engagement therewith. The results are the favorable transfer of data between disk and head assemblies and the reduced wear of their contacting surfaces.

The above and other features and advantages of our invention and the manner of realizing them will become more apparent, and the invention itself will best be understood, from a study of the following description and appended claims, with reference had to the attached drawings showing a preferred embodiment of our invention.

DESCRIPTION OF THE PREFERRED EMBODIMENT

Figure 1:
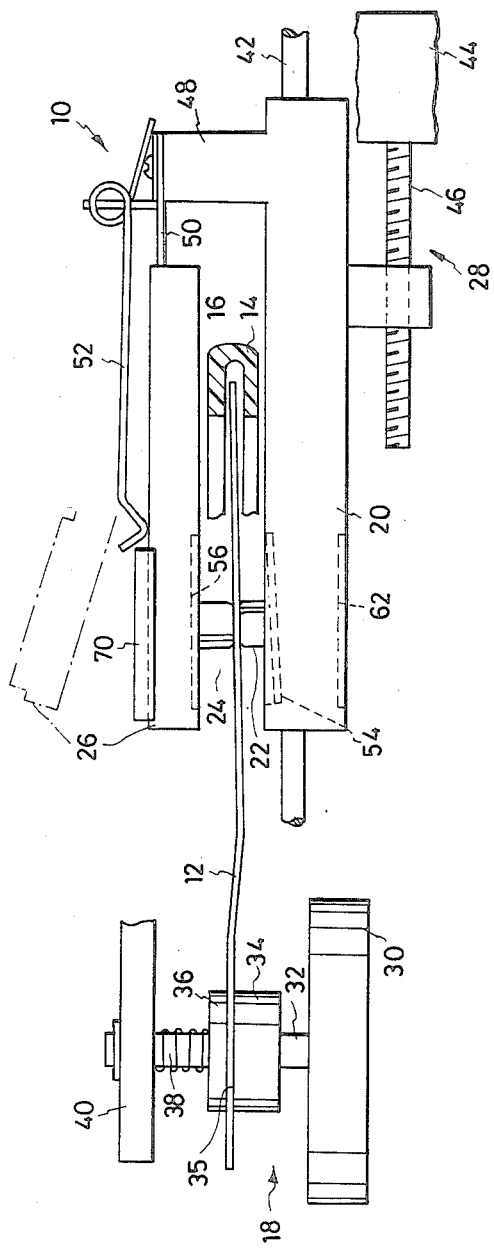
FIG. 1 is a diagrammatic elevation of the pertinent parts of a data transfer apparatus constructed in accordance with the novel concepts of our invention, shown together with a double sided flexible magnetic disk cartridge being held in a data transfer position in the apparatus, with the envelope of the disk cartridge being shown sectioned and partly broken away for illustrative convenience.

We have diagrammatically illustrated in FIG. 1 the general organization of the data transfer apparatus only to an extent necessary for a full understanding of our invention. Generally designated 10, the data transfer apparatus is therein shown together with a double sided flexible magnetic disk 12 mounted in a preassigned data transfer position within the apparatus. The magnetic disk 12 is conventionally rotatably housed in a protective, apertured envelope 14 to make up a disk cartridge 16. The data transfer apparatus 10 broadly comprises:

1. A disk drive mechanism 18 for revolving in a predetermined direction the magnetic disk 12 being held in the data transfer position.

2. A carriage 20 reciprocably movable radially of the magnetic disk 12.

3. A first or lower magnetic transducer head assembly 22 mounted to the carriage 20.

4. A second or upper magnetic transducer head assembly 24 mounted to a load arm 26 which in turn is hingedly mounted on the carriage 20.

5. A head transport mechanism 28 coupled to the carriage 20 for transporting the transducer head assemblies 22 and 24 radially of the magnetic disk 12.

The disk drive mechanism 18 includes an electric disk drive motor 30 having an output shaft 32 extending upwardly therefrom and terminating in a drive hub 34. This drive hub has a disk bearing surface 35 for holding the magnetic disk 12 thereon during its data transfer with the pair of transducer head assemblies 22 and 24. Disposed over the drive hub 34 is a clamp or collet 36 rotatably mounted on a shaft 38 depending from the distal end of a clamp arm 40. As is disclosed in the aforementioned Noda U.S. patent application Ser. No. 434,400, now U.S. Pat. No. 4,602,306, the clamp arm 40 is proximally pivoted on a stationary part, not shown, of the apparatus 10 and is sprung in such a direction that the clamp 36 thereon comes into engagement with the drive hub 34 to clamp the magnetic disk 12 therebetween. The disk cartridge 16 is to be loaded in and unloaded from the apparatus 10 along a plane containing the disk bearing surface 35, or along a plane approximately parallel thereto, while the clamp 36 is held out of engagement with the drive hub 34.

Preferably molded of a plastic, the carriage 20 is slidable along a pair of guide rods 42, one seen in FIG. 1, extending radially of the magnetic disk 12. The carriage 20 is coupled to a head transport motor 44 of the known electric stepping type thereby by to be reciprocably and incrementally transported radially of the magnetic disk 12 to enable the head assemblies 22 and 24 to access the individual tracks of information on the magnetic disk 12. Also forming part of the head transport mechanism 28 is a rotary to linear converter for translating the incremental rotation of the head transport motor 44 into the linear stepwise travel of the carriage 20 along the guide rod pair 42. We have shown the rotary to linear converter as comprising a lead screw 46 by way of example only. We could, of course, employ other types of devices such as a rack and pinion arrangement or a steel belt wound into the shape of the Greek alpha.

The load arm 26 is pivoted on an upstanding support 48 on the carriage 20 via a cantilever spring 50 for movement between a head loading position depicted by the solid lines in FIG. 1 and an unloading position indicated by the dashed lines in the same figure. The cantilever spring 50 biases the load arm from the unloading toward the loading position. A torsional load spring 52 also acts on the load arm 26 for energizing, when the load arm is in the head loading position, the upper head assembly 24 against the lower head assembly 22 via the magnetic disk 12 and hence for holding both head assemblies in proper data transfer contact with the magnetic disk.

Figure 2:
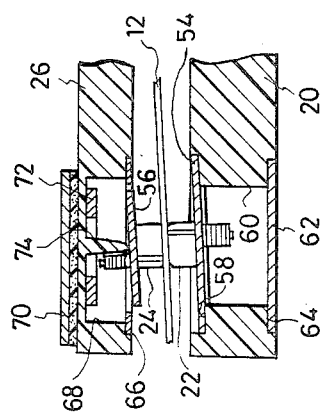
FIG. 2 is a fragmentary, vertical section through the data transfer apparatus of FIG. 1, showing in particular the pair of magnetic transducer head assemblies together with their mounting and supporting means.
Figure 3:
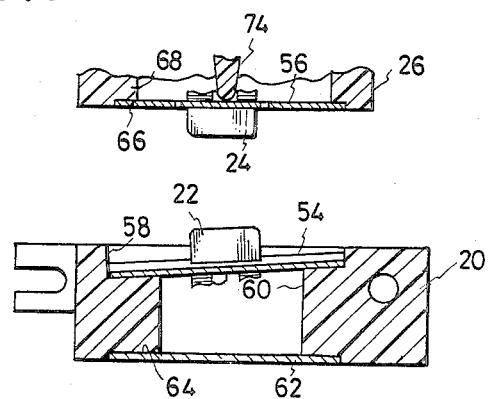
FIG. 3 is also a fragmentary, vertical section through the data transfer apparatus of FIG. 1, taken, however, along a plane angularly displaced 90 degress from the plane of the section of FIG. 2 and also showing in particular the pair of magnetic transducer head assemblies together with their mounting and supporting means.

As shown also in FIGS. 2 and 3, the lower transducer head assembly 22 is mounted to the carriage 20 via a first flexure seat 54, whereas the upper transducer head assembly 24 is mounted to the load arm 26 via a second flexure seat 56. The first or lower flexure seat 54 is engaged in a top end enlargement 58 of an aperture 60 in the carriage 20. The top end enlargement 58 is at an angle to the plane of the magnetic disk 12, so that the lower head assembly 22 is inclined in the same direction, and at the same angle, as the enlargement 58 with respect to the plane of the magnetic disk, as we will discuss in more detail subsequently. A shield plate 62 of "Permalloy" (trademark for a nickel iron alloy) or like material is engaged in a bottom end enlargement 64 of the aperture 60 for magnetically shielding the lower transducer head assembly 22.

The second or upper flexure seat 56 is engaged in an enlarged end 66 of a downwardly open depression 68 in the load arm 26. The upper head assembly 24 is dependingly mounted on this flexure seat 56. When the load arm 26 is in the head loading position, the two head assemblies 22 and 24 are in register with each other, only with a slight offset in their gap positions to avoid flux interaction. A shield plate 70 of "Permalloy" or like material is mounted on the load arm 26 in overlying relation to the upper head assembly 24. A shield ring 72 is additionally affixed to the bottom of the depression 68. Molded integral with the load arm 26, a pivot 74 extends downwardly through the shield ring 72 into abutment against the upper flexure seat 56.

Figure 4:
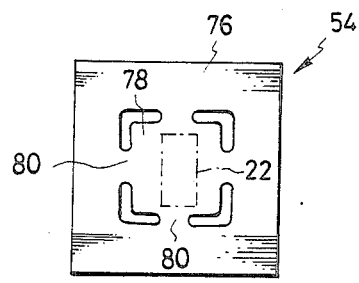
FIG. 4 is a plan view of the flexure seat for the first or lower head assembly of the data transfer apparatus.

FIG. 4 is an illustration of the lower flexure seat 54. It takes the form of a flat, square sheet of resilient material, having an outer portion 76, an inner portion 78, and a plurality of bridge portions 80 joining the outer and inner portions. The outer portion 76 of the lower flexure seat 54 is rigidly engaged with the top end enlargement 58 of the aperture 60 in the carriage 20. The inner portion 78 has the lower head assembly 22 mounted thereon. Consequently, the lower head assembly 22 is resiliently displaceable, though to a limited extent, only in a direction normal to the plane of the lower flexure seat 54. We believe that such approximately vertical displacement of the lower head assembly 22 is desirable to cushion the impact of head loading and to enable both head assemblies 22 and 24 to follow the vertical undulations of the magnetic disk 12.

Figure 5:
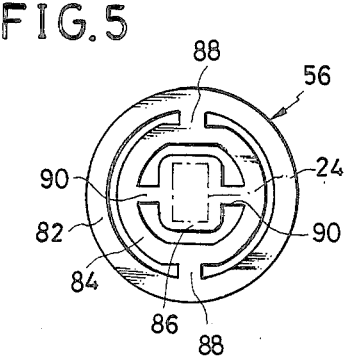
FIG. 5 is a plan view of the flexure seat for the second or upper head assembly of the data transfer apparatus.

As shown in FIG. 5, on the other hand, the upper flexure seat 56 is configured to gimbal the upper head assembly 24. The upper flexure seat 56 takes the form of a flat, circular sheet of resilient material, comprising an annular outer portion 82, an annular intermediate portion 84, and a rectangular central portion 86. The outer portion 82 is joined to the intermediate portion 84 via a first pair of diametrically opposed bridge portions 88, and the intermediate portion is joined to the central portion 86 via a second pair of diametrically opposed bridge portions 90 angularly displaced 90 degrees from the first pair of bridge portions. The outer portion 82 is rigidly engaged with the enlarged mouth 66 of the depression 68 in the load arm 26. The central portion 86 bears the upper head assembly 24. Thus, as the pivot 74 butts on the central portion 86, the upper flexure seat 56 supports the upper head assembly 24 in a gimbal fashion.

As will be observed from FIGS. 1 through 3, the upper flexure seat 56 is parallel to the normal plane of the magnetic disk 12, that is, to a horizontal plane containing the disk bearing surface 35 of the drive hub 34, when the load arm 26 is in the head loading position indicated by the solid lines in FIG. 1. We will refer to this horizontal plane as the "reference plane" hereafter. As the upper flexure seat 56 is parallel to the reference plane, so normally is the gapped disk engaging surface 30 of the upper head assembly 24, although in fact the gimbaled upper head assembly acquires a slanting attitude on being pressed against the lower head assembly 22 via the magnetic disk 12 under spring pressure, as will become more understandable as the description proceeds.

The lower flexure seat 54, on the other hand, is at an angle to the reference plane, holding the lower head assembly 22 thereon in a slanting attitude when no external force is exerted thereon.

Figure 6:
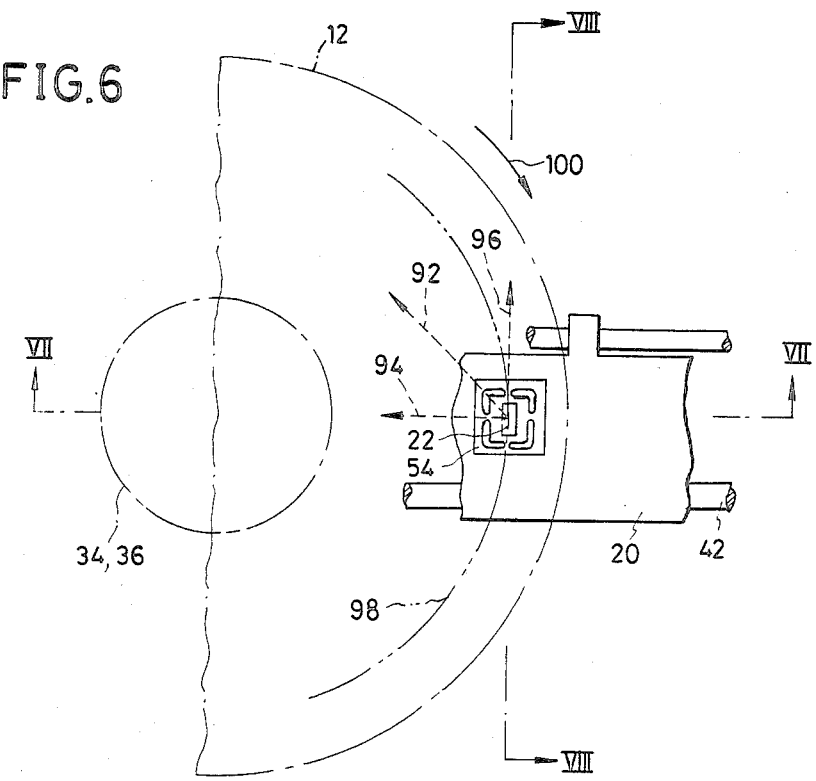
FIG. 6 is a diagrammatic plan view showing in particular the lower head assembly in relation to the flexible magnetic disk being held in the data transfer position.

FIG. 6 clearly demonstrates the direction in which the lower flexure seat 54, and therefore the lower head assembly 22, is inclined with respect to the reference plane. The arrow 92 in this figure broadly indicates the direction of this inclination, which in fact can be anywhere between a first extreme direction 94 oriented radially inwardly of the magnetic disk 12 from the lower head assembly 22, and a second extreme direction 96 extending from the lower head assembly tangentially of a notional circle 98 drawn concentrically on the magnetic disk 12, the second extreme direction 96 being oriented upstream of the magnetic disk with respect to its predetermined direction of rotation indicated by the arrow 100.

Figure 7A:
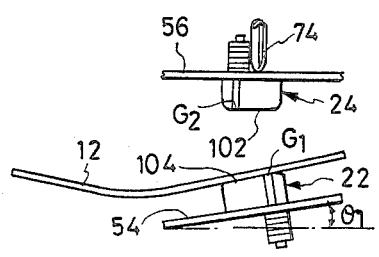
FIGS. 7A and 7B are both sections taken along the line VII—VII of FIG. 6 and showing in particular the angular positions of the pair of head assemblies in a radial direction of the magnetic disk when they are out of contact (FIG. 7A), and in contact (FIG. 7B), with each other.
Figure 7B:
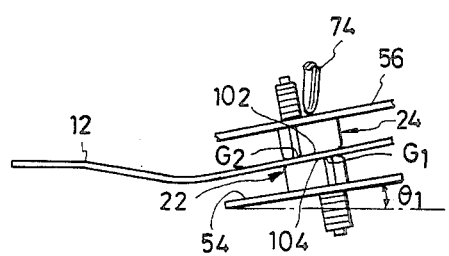
Figure 8A:
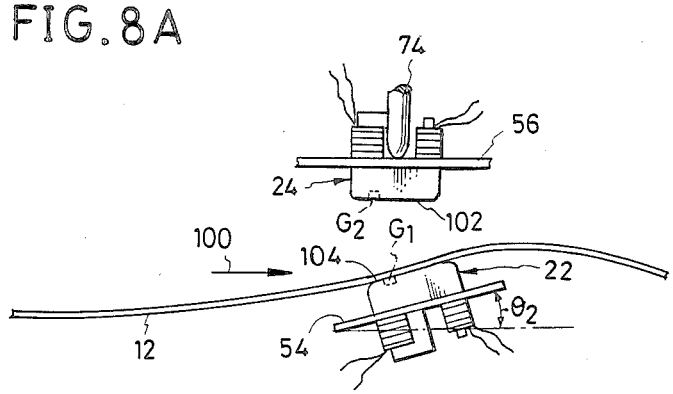
FIGS. 8A and 8B are both sections taken along the line VIII—VIII of FIG. 6 and showing in particular the angular positions of the pair of head assemblies in a tangential direction of the magnetic disk when they are out of contact (FIG. 8A), and in contact (FIG. 8B), with each other.
Figure 8B:
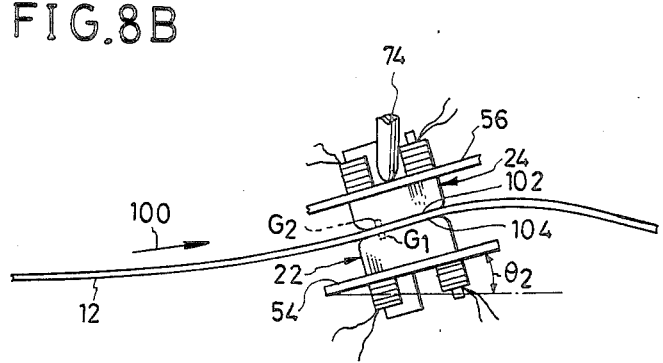

FIGS. 7A and 8A illustrate the consequent angular orientations of the head assemblies 22 and 24 in the radial and tangential directions, respectively, of the magnetic disk 12 when they are not loaded on the disk. FIGS. 7B and 8B illustrate the angular orientations of the head assemblies 22 and 24 in the radial and tangential directions, respectively, of the magnetic disk 12 they they are loaded on the disk. As will be discerned from FIGS. 7A and 8A, the gapped disk engaging surface 102 of the upper head assembly 24 is parallel to the reference plane when not pressed against the gapped disk engaging surface 104 of the lower head assembly 22 via the magnetic disk 12. However, with its disk engaging surface 104 slanting away from the reference plane in the direction of the arrow 92 as above, the lower head assembly 22 is both at an angle $\theta 1$ to the reference plane in the radial direction of the magnetic disk 12 and at an angle $\theta 2$ to the reference plane in the tangential direction of the disk. It will further be observed from FIGS. 7B and 8B that the upper head assembly 24 when pressed against the lower head assembly 22 via the intervening magnetic disk 12 have the same angular orientations with respect to the reference plane as the lower head assembly in both radial and tangential directions of the magnetic disk.

Clamped at its central portion as in FIG. 1 and slidably engaged between the pair of opposed head assemblies 22 and 24 spaced radially outwardly from the clamping means, the flexible magnetic disk 12 unavoidably develops a slack in its radial direction, as illustrated with some exaggeration in FIGS. 7A and 7B. Being at the angle $\theta 1$ to the reference plane in the radial direction of the disk, the disk engaging surface 104 of the lower head assembly 22 can remain in good data transfer engagement with the disk. Further, since the lower head assembly 22 is substantially locked against tilting movements by the lower flexure seat 54, and since the upper head assembly 24 is gimbaled by the upper flexure seat 56, the upper head assembly when pressed against the lower head assembly via the magnetic disk acquires the same slanting attitude as the lower head assembly, as illustrated in FIG. 7B. Accordingly, the disk engaging surface 102 of the upper head assembly 24 can also be held in proper data transfer contact with the magnetic disk.

The reference characters G1 and G2 in FIGS. 7A and 7B denote the data transfer gaps (e.g. read/write gaps) of the head assemblies 22 and 24, respectively. The head assemblies 22 and 24 will make favorable data transfer contact with the opposite faces of the magnetic disk 12 particularly at those parts of their disk engaging surfaces which are in the immediate vicinities of the gaps G1 and G2.

As illustrated in FIGS. 8A and 8B, the magnetic disk 12 will also develop undulations in its tangential direction during rotation in sliding engagement with the pair of head assemblies 22 and 24. The disk engaging surfaces 102 and 104 of the head assemblies 22 and 24 are both at the angle $\theta 2$ to the reference plate when loaded on the disk, so that the leading end portions of the disk engaging surfaces, directed to the left in FIGS. 8A and 8B, with respect to the predetermined direction 100 of rotation of the magnetic disk 12, will exert less frictional forces on the disk than heretofore. The abrasion of the magnetic disk will therefore be materially reduced.

During the rotation of the magnetic disk 12 in sliding contact with the head assemblies 22 and 24, a torsional force will develop frictionally about the pivot 74. Accordingly, as the gaps G1 and G2 of the head assemblies 22 and 24 are disposed just about a downward extension of the pivot 74 as in FIG. 8B, the edges of the disk engaging surfaces 102 and 104 bounding the gaps will become pressed harder against the disk for the establishment of even more favorable data transfer engagement therebetween.

The flexible magnetic disk for use with the data transfer apparatus of our invention is generally housed in a protective envelope such as that shown at 14 in FIG. 1. The degree of undulations of the magnetic disk away from its own normal plane is therefore relatively small, being dependent largely upon the spacing between the antifriction linings of the envelope. Thus the angle of the disk engaging surface 104 of the lower head assembly 22 in the direction of the arrow 92 with respect to the reference plane can be as small as 30 minutes or so at the greatest. Generally, the direction and angle of the inclination of the lower head assembly 22 should be determined in consideration of the expected wobbling movements of the magnetic disk for use with the data transfer apparatus.

As will be seen by referring back to FIGS. 2 and 3 in particular, the required slanting attitude of the lower head assembly 22, or of its disk engaging surface 104, is realized in accordance with our invention merely by tilting the lower flexure seat 54 on the carriage 20. The head assembly itself can therefore be of the standard design.

Although we have shown and described our invention in terms of but one preferable embodiment thereof, we recognize that this embodiment is susceptible to a variety of modifications, alterations and adaptations within the broad teaching hereof. For example:

1. The lower head assembly could be rigidly mounted directly to the carriage, instead of via the flexure seat as in the illustrated embodiment.
2. The lower head assembly could be inclined only in either of the radial (first extreme) or tangential (second extreme) directions of the magnetic disk.
3. The carriage itself could be set at the required angle to the reference plane, instead of tilting the lower flexure seat thereon.
4. The upper head assembly could also be tilted with respect to the reference plane, in the same direction and through the same angle as the lower head assembly.
5. The flexible magnetic disk for use with the apparatus of our invention could be of the familiar 3.5 inch type, having a hub of ferromagnetic material to be magnetically attracted into positive engagement with a turntable bearing a permanent magnet.

All these and other changes of the above disclosed embodiment are considered to fall within the scope of our invention as expressed in the following claims.

We claim:

1. An apparatus for data transfer with a double sided flexible magnetic disk, comprising:
   (a) disk drive means for imparting a predetermined direction of rotation to the magnetic disk in a preassigned data transfer position, the disk drive means including a contact surface for direct contact with the magnetic disk during its rotation;
   (b) carriage means controllably movable radially of the magnetic disk being held in the data transfer position;
   (c) a first flexure seat of planar shape on the carriage means;
   (d) a first magnetic transducer head assembly mounted on the first flexure seat and thereby resiliently supported on the carriage means, the first head assembly having a gapped disk engaging surface for contact with one side of the magnetic disk, the disk engaging surface being parallel to the first flexure seat, the first flexure seat being so mounted to the carriage means that the disk engaging surface of the first head assembly is at an angle to a reference plane containing the contact surface of the disk drive means, the disk engaging surface of the first head assembly slanting away from the reference plane in a direction anywhere between a first extreme direction oriented radially inwardly of the magnetic disk from the first head assembly and a second extreme direction extending from the first head assembly tangentially of a notional circle drawn concentrically on the magnetic disk, the second extreme direction being oriented upstream of the magnetic disk with respect to the predetermined direction of rotation thereof;
   (e) a second flexure seat on the carriage means; and
   (f) a second magnetic transducer head assembly mounted on the second flexure seat and thereby gimbaled on the carriage means, the second head assembly having a gaped disk engaging surface for contact with the other side of the magnetic disk, the disk engaging surfaces of the first and second transducer head assemblies being substantially in register with each other when in contact with the magnetic disk.

2. The data transfer apparatus as set forth in claim 1, wherein the angle of inclination of the disk engaging surface of the first magnetic transducer head assembly in the specified direction with respect to the reference plane is up to about 30 minutes.

3. An apparatus for data transfer with a double sized flexible magnetic disk which is subject to wobbling movements in both radial and tangential directions thereof during rotation, the apparatus comprising:
   (a) disk clamping and driving means for clamping the magnetic disk in a preassigned data transfer position and for imparting a predetermined direction of rotation to the magnetic disk, the disk clamping and driving means having a contact surface for direct contact with the magnetic disk during its rotation;
   (b) a carriage movable radially of the magnetic disk being held in the data transfer position;
   (c) a first flexure seat of planar shape on the carriage means;
   (d) a first magnetic transducer head assembly mounted on the first flexure seat and thereby supported on the carriage for resilient displacement only in a direction normal to the plane of the first flexure seat, the first head assembly having a gapped disk engaging surface for contact with one side of the magnetic disk, the disk engaging surface being parallel to the first flexure seat, the first flexure seat being so mounted to the carriage that the disk engaging surface of the first head assembly is at an angle to a reference plane containing the contact surface of the disk clamping and driving means, the disk engaging surface of the first head assembly slanting away from the reference plane in a direction anywhere between a first extreme direction oriented radially inwardly of the magnetic disk from the first head assembly and a head assembly tangentially of a notional circle drawn concentrically on the magnetic disk, the second extreme direction being oriented upstream of the magnetic disk with respect to the predetermined direction of rotation thereof;
   (e) a load arm hingedly mounted to the carriage;
   (f) a second flexure seat on the load arm;
   (g) a second magnetic transducer head assembly mounted on the second flexure seat and thereby gimbaled on the load arm in opposed relation to the first head assembly, the second head assembly having a gapped disk engaging surface for contact with the other side of the magnetic disk, the disk engaging surfaces of the first and second head assemblies being substantially in register with each other when in contact with the magnetic disk;

(h) resilient means acting on the load arm for urging the second head assembly against the first head assembly via the intervening magnetic disk and hence for holding the disk engaging surface of both first and second head assemblies in proper contact with the magnetic disk in the face of its wobbling movements during rotation; and (i) a head transport means for moving the carriage transversely of the magnetic disk.

* * * * *